United States Patent
Kaminow

[11] 3,877,782
[45] Apr. 15, 1975

[54] ELECTRO-OPTICAL THIN FILM DEVICE

[75] Inventor: Ivan Paul Kaminow, New Shrewsbury, N.J.

[73] Assignee: Bell Telephone Laboratories, Incorporated, Murray Hill, N.J.

[22] Filed: Jan. 23, 1974

[21] Appl. No.: 435,694

[52] U.S. Cl. .................. 350/96.WG; 350/160 R
[51] Int. Cl. ............................................. G02b 5/14
[58] Field of Search ................... 350/96 WG, 160 R

[56] References Cited
UNITED STATES PATENTS
3,795,433  3/1974  Channin .................. 350/96 WG
3,810,688  5/1974  Ballman et al. ............. 350/96 WG

*Primary Examiner*—John K. Corbin
*Attorney, Agent, or Firm*—L. C. Canepa

[57] ABSTRACT

The static loss characteristics of an integrated optical thin-film converter that includes an interdigital electrode grating are reduced by insuring that the optical transmission path in the thin film does not pass below any portion of the electrode grating.

2 Claims, 3 Drawing Figures

PATENTED APR 15 1975 3,877,782

ELECTRO-OPTICAL THIN FILM DEVICE

BACKGROUND OF THE INVENTION

This invention relates to integrated optical devices and, more particularly, to an electrode structure for such a device.

Integrated optics is a recently developed technology in which thin-film techniques are applied to the fabrication of miniature compact optical devices. Due to their small size, rugged and reproducible construction and low cost, such devices are attractive candidates for inclusion in high-capacity optical communication systems.

For an overview of the field of integrated optics see, for example, "A Survey of Integrated Optics" by S. E. Miller, *IEEE Journal of Quantum Electronics*, Vol. QE-8, No. 2, February 1972, pp. 199–205.

In an integrated optical device it is known to form an interdigital electrode grating on an electro-optic waveguiding thin film to achieve mode conversion of an optical signal propagating in the film. Quiescently, i.e., with no voltage applied to the electrodes that form the grating, such electro-optical converters as heretofore constructed are characterized by a moderate amount of optical scattering (loss). This arises from the fact that the beam propagating in the thin film passes under and is influenced by successive static discontinuities formed by the electrodes.

SUMMARY OF THE INVENTION

An object of the present invention is an improved electrode structure for an integrated optical device.

More specifically, an object of this invention is an improved electrode configuration that is adapted to establish an electrically induced grating in a selected portion of a waveguiding thin film.

Briefly, these and other objects of the present invention are realized in a specific illustrative embodiment thereof that includes plural pairs of spaced-apart electrodes formed on an electro-optic waveguiding thin film. To form the embodiment, the elements of a conventional interdigital electrode grating are moved apart in a direction perpendicular to the direction of propagation of an optical signal to be transmitted through the thin film. The elements are also shifted longitudinally so that corresponding elements directly face each other above a series of spaced-apart reference lines each of which is perpendicular to the propagation path. The spacing between facing elements is selected such that the optical transmission path in the thin film does not pass beneath any portion of the discontinuous electrode grating. As a result, the static losses (scattering) experienced by the optical signal in the inventive embodiment are eliminated relative to those present in a conventional such device. At the same time the voltage required to be applied to the electrodes of the embodiment to achieve a given amount of mode conversion is approximately the same as that required in a conventional converter.

BRIEF DESCRIPTION OF THE DRAWING

A complete understanding of the present invention and of the above and other objects thereof may be gained from a consideration of the following detailed description of two specific illustrative embodiments thereof presented hereinbelow in connection with the accompanying drawing in which.

DETAILED DESCRIPTION

Figure 1:
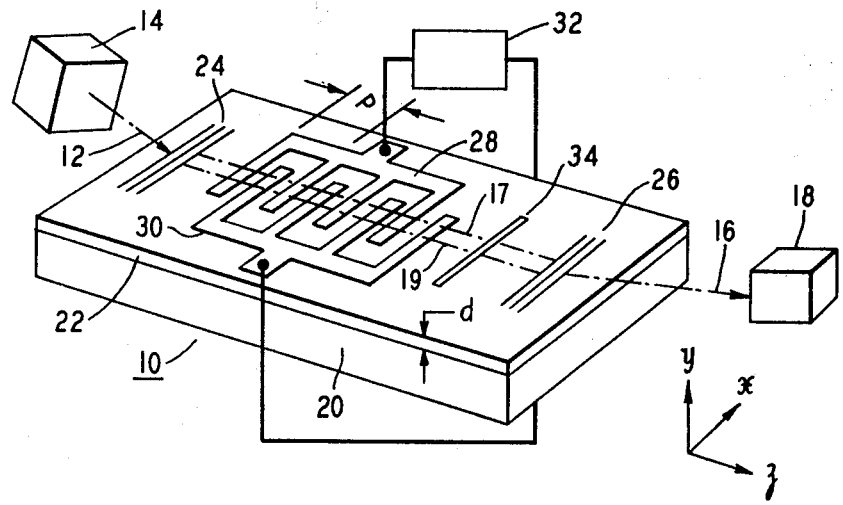
FIG. 1 shows a prior art integrated optical device that includes a conventional interdigital electrode grating.

FIG. 1 is a pictorial illustration of a prior art integrated optical device 10 positioned in the path of incident radiation (represented by dashed line 12) supplied by a light source 14. The radiation is typically coherent with wavelengths in the optical range (which includes visible and near-visible wavelengths) and may be provided by any suitable source, for example a laser. Any portion of the incident beam that is transmitted through the device 10 in the z direction is directed along an output path (indicated by dashed line 16) to impinge upon a utilization device 18 that comprises, for example, a conventional photodetector. The approximate $x$-direction limits of the beam that propagates in the device 10 are represented by dashed lines 17 and 19.

The prior art device 10 of FIG. 1 includes a substrate 20 on which a thin film 22 of an electro-optic dielectric material is deposited. It is known that for the film 22 to support propagating optical modes and to act as a waveguide for light waves, the refractive index of the film 22 must be greater than that of the substrate 20. Both of the indices are assumed to be greater than the refractive index of the air space above the device 10. If desired, a suitable covering layer (not shown) having an index of refraction less than that of the guiding film 22 may be deposited on the device to protect its upper surfaces and/or to provide a symmetrical guiding structure. The substrate 20 may, for example, be made of glass, with a suitable waveguiding layer or stripe of electro-optic material deposited on the substrate. But for purposes of a specific example herein it will be assumed that the substrate is instead made of $LiNbO_3$ or $LiTaO_3$ which are electro-optic materials. Illustratively, the substrate is oriented such that the $c$ axis of the $LiNbO_3$ or $LiTaO_3$ crystal is parallel to the $y$ axis shown in FIG. 1.

For a $LiNbO_3$ or $LiTaO_3$ substrate, an optical waveguiding layer may be formed thereon by out-diffusion. The selective out-diffusion of $Li_2O$ in a substrate of $LiTaO_3$ or $LiNbO_3$ to form a surface-guiding layer is disclosed in J. R. Carruthers-I. P. Kaminow application Ser. No. 324,884, filed Jan. 18, 1973 now U.S. Pat. No. 3,837,827, issued Sept. 24, 1974. Alternatively, a waveguiding layer may be formed on the substrate 20 by epitaxially depositing a higher-index layer thereon.

Radiation supplied by the source 14 may be introduced into and extracted from the film 22 of the device 10 in any one of a variety of ways known in the art. For example, prism couplers of the type described in *Applied Physics Letters*, Vol. 14, page 291 (1969), may be utilized for that purpose. Advantageously, in applications in which miniaturization, ruggedness and simplicity are important, optical coupling and decoupling are accomplished by means of optical diffraction gratings formed directly on the surface of the guiding film 22 so as to be structurally integral therewith. Such couplers, which are, for example, described in A. Ashkin-E. P. Ippen U.S. Pat. No. 3,674,335, issued July 4, 1972, can be constructed to exhibit coupling efficiencies of better than 70 percent.

For illustrative purposes, gratings 24 and 26, each depicted as a series of parallel lines, are respectively utilized in the prior art FIG. 1 device to couple optical waves into and out of the waveguiding film 22.

Illustratively, the film 22 of FIG. 1 has a thickness $d$ approximating the wavelength of the radiation to be propagated therein, so that the radiation is effectively confined in the thickness dimension by the dielectric discontinuities provided by the major surfaces of the film, that is, the substrate-to-film and air space-to-film interfaces. For the purposes of this invention the thickness of the film may be anywhere within the range of 0.1 to 100 times the wavelength to be propagated as measured in the waveguide, but is preferably between 1 and 10 times the wavelength.

Depicted on the top surface of the surface of the thin film 22 of FIG. 1 is a conventional interdigital electrode structure comprising metallic electrodes 28 and 30. Illustratively, the depicted fingers or elements of these electrodes are equally spaced apart. Each such finger includes a portion disposed directly above the aforementioned optical beam propagation path represented by dashed lines 17 and 19.

As shown in FIG. 1, a voltage source 32 is utilized to apply a potential difference between the electrodes 28 and 30. As a result there is thereby established in the thin film 22 in spaced-apart portions of the optical beam propagation region an electric field oriented in the y and z directions. In this way spatially periodic refractive index variations are induced in the film 22 along the indicated propagation path.

By proper selection of the spacing between adjacent fingers of the electrodes 28 and 30 and of the value of the voltage supplied by the source 32 of FIG. 1, the refractive index variation induced in the thin film 22 is effective, for example, to convert an input TM-mode optical signal to a different TM-mode one. As is known in the art, the period of the induced field necessary to provide such a TM-to-TM mode conversion is basically that which is necessary to match the wave velocities of the two modes in the film. Thus, for example, for the fundamental and first-order TM modes (designated $TM_0$ and $TM_1$, respectively) the period P (see FIG. 1) is given by the expression $$P = (\lambda/N_{TM_1} - N_{TM_0})$$

where $\lambda$ is the free space wavelength of the input beam supplied by the source 14 and $N_{TM_0}$ and $N_{TM_1}$ are the respective effective indices of refraction for the fundamental TM mode and the first-order TM mode in the film 22.

The $TM_0$ and $TM_1$ modes are coupled out of the film 22 of FIG. 1 by the grating 26 at different angles. The energy in each mode can then be detected by the device 18 equipped with a suitable iris arrangement (not shown).

If the $c$ axis of the electro-optic material is oriented along $x$ in FIG. 1 instead of $y$, then coupling between TE and TM modes is possible. To differentiate between TE- and TM-mode signals the prior art device 10 of FIG. 1 includes a polarizer. The polarizer may simply comprise a thin strip 34 of aluminum deposited on the thin film 22. Illustratively, the polarizer 34 absorbs the TM portion of the propagating optical signal but freely passes the TE portion. Hence, the intensity of the optical signal delivered to the utilization device 18 varies according to the degree of mode conversion achieved by the depicted electrode grating structure. In turn this depends on the value of the voltage applied to the electrodes 28 and 30 by the source 32.

Ideally, in the absence of a voltage applied to the electrodes 28 and 30 of FIG. 1, no mode conversion should occur in the prior art device 10 and substantially all of the applied input optical signal should be delivered to the utilization device 18. But it is apparent that discontinuities are present in the waveguiding structure even in the absence of an applied voltage. These discontinuities arise from the fact that the propagating beam passes under and is influenced by successive static portions of the metallic fingers of the electrodes 28 and 30. These surface discontinuities cause a portion of the beam propagating in the thin film 22 to be scattered into other guided modes or into the substrate 20. This scattered portion of the beam represents lost energy which is not delivered to the output utilization device 18.

In accordance with the principles of the present invention, the static scattering losses of a device of the type shown in FIG. 1 are minimized. This is achieved by reconfiguring the standard electrode grating structure described hereinabove. A specific illustrative such reconfiguration is depicted in FIG. 2.

Figure 2:
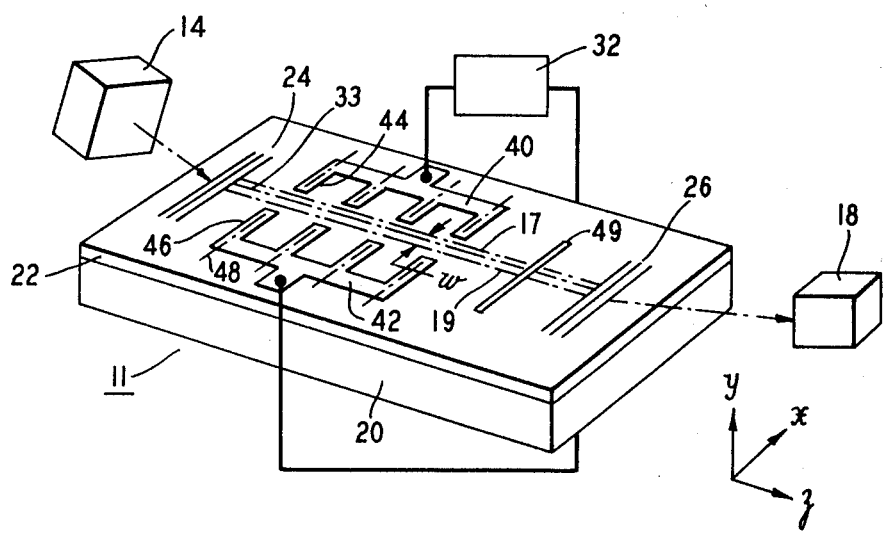
FIGS. 2 and 3 each depict a specific illustrative integrated optical device made in accordance with the principles of the present invention.

A number of the structural components illustrated in FIG. 2 may be identical to elements previously described above. For ease of comparison these components are identified in FIG. 2 with the same reference numerals employed above. These components include input and output grating couplers 24 and 26, optical signal source 14, output utilization device 18 and voltage source 32.

For illustrative purposes the optical waveguiding layer 22 of the device 11 shown in FIG. 2 is assumed to be formed by the out-diffusion process mentioned above. Further, in one specific example of an optical mode converter made in accordance with the principles of this invention, it is assumed that the substrate 20 comprises $LiNbO_3$ or $LiTaO_3$. Optical signal mode conversion in such an arrangement may be carried out, for example, by establishing an $x$-direction electric field in longitudinally spaced-apart portions of the film 22 in the region of a propagating beam.

In accordance with the invention, an electrically induced grating is established in the electro-optic thin film 22 of FIG. 2 to convert a guided TM-mode optical signal to a guided TE-mode signal, with the $c$ axis of the electro-optic material being arranged to be parallel to the $y$ axis. Or a TE- or a TM-mode guided signal of one order can be converted to a signal of a corresponding mode but of a different order, if the $c$ axis is parallel to the $x$ axis. In addition, a guided signal of either mode may be converted to an unguided mode, namely one that radiates out of the plane of the film 22 into the substrate 20. With respect to the positive $z$ direction, such radiation may be controlled to occur downward and forward into the substrate or downward and backward into the substrate.

Illustratively, assume that the source 14 shown in FIG. 2 is a helium-neon laser adapted to supply a focused 0.633-$\mu$m beam polarized approximately parallel to the $y$ axis. Assume further that the device 11 comprises a $LiTaO_3$ crystal whose $c$ axis is also parallel to the $y$ axis. Such an input signal will propagate in the thin film 22 in the z direction along a reference axis 33 as a guided TM-mode wave. The lateral or x-direction extent of the propagating beam is defined approximately by dashed lines 17 and 19.

In accordance with the principles of the present invention, the fingers of a metallic electrode grating structure are positioned on the top surface of the thin film 22 of FIG. 2 such that no portion of the fingers is disposed above the waveguiding path represented by lines 17 and 19. More specifically, the respective facing fingers of electrodes 40 and 42 are spaced apart in the x direction a distance w that approximates the width of the focused beam propagated along the reference axis 33. In one specific illustrative example, w approximates 50 μm.

The opposed elements of each different pair of electrode fingers shown in FIG. 2 are positioned on the film 22 directly above a different one of a set of spaced-apart reference lines that are perpendicular to the axis 33. Thus, for example, facing fingers 44 and 46 are positioned directly above and centrally located with respect to dashed reference line 48.

By means of the source 32 of FIG. 2, a voltage can be applied between the electrodes 40 and 42. An x-direction electric field pattern is thereby established in the thin film 22 between the elements of each facing pair of electrode fingers. This x-direction field pattern, which is coupled to the $r_{51}$ electro-optic tensor coefficient of $LiTaO_3$, is effective to establish a grating in the film 22. It is apparent that the specific grating established in the illustrative device 11 includes four electrically induced refractive index periods.

Assume that the grating established in the $LiTaO_3$ film 22 of the device 11 of FIG. 2 covers 1 centimeter of the path of the propagating beam. Further, assume for the sake of a specific example that the z-direction width of each finger approximates the z-direction spacing between adjacent fingers. In that case an applied voltage of about 50 volts between the electrodes 40 and 42 is effective to completely convert the aforementioned guided TM-mode signal to the unguided TE-mode signal. The TE-mode signal radiates into the substrate 20 and accordingly is not delivered to the utilization device 18. In this way, an efficient on-off optical switch is provided.

In response to lower voltages supplied by the source 32, any specified portion of the input optical beam may be controlled to continue to propagate in the thin film 22 of FIG. 2 as a TE-mode signal to reach the output coupler 26. In that case an optical signal of a specified intensity, proportional to the magnitude of an applied modulating voltage, is delivered to the utilization device 18.

If the device 11 of FIG. 2 is operated to convert a guided TE-mode signal to a guided TM-mode signal or vice versa, a conventional polarizer 49 may be added to the device to block one designated mode and pass the other.

In a planar waveguiding structure of the type shown in FIG. 2 there is no optical beam spreading normal to the plane (i.e., in the y direction) but some diffraction of the focused beam in the x direction will occur. To limit such diffraction, formation of a higher-index layer on the substrate 20 may be restricted to a longitudinal stripe surface region of the substrate. Or after forming a higher-index layer on the entire top surface of the substrate 20, all or most of that layer except a narrow stripe or ridge portion may be selectively removed by etching or ion milling or other techniques. In these ways waveguiding action may be limited to a stripe or ridge in the device.

Figure 3:
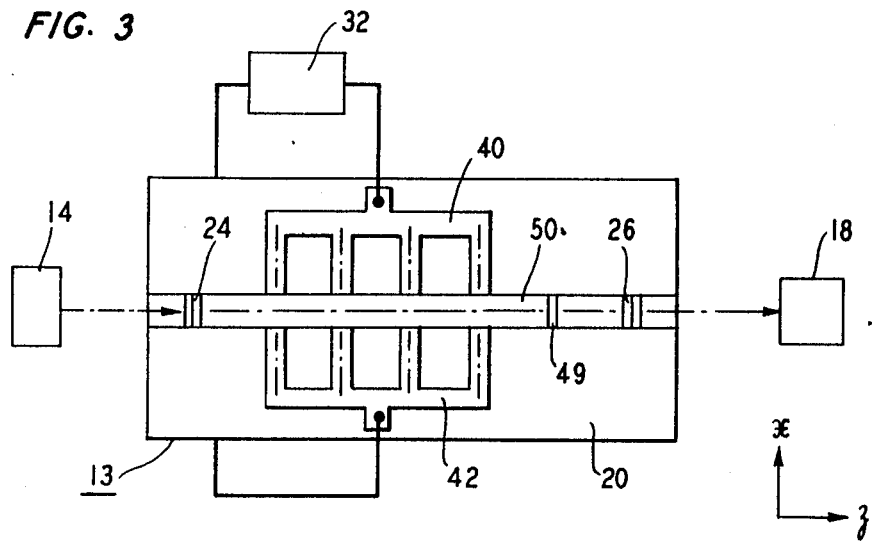

FIG. 3 shows an integrated optical device 13 including such an optical waveguiding ridge portion 50 formed on a substrate 20. In accordance with the principles of the present invention, the ends of the fingers of electrodes 40 and 42 are butted against the sides of the waveguiding ridge 50. Spaced-apart electrically induced refractive index discontinuities may be thereby established in the ridge 50 to achieve optical signal mode conversion of the type described above.

It is to be understood that the various abovedescribed arrangements are only illustrative of the application of the principles of the present invention. In accordance with these principles, numerous other arrangements may be devised by those skilled in the art without departing from the spirit and scope of the invention. For example, additional electrode fingers may be respectively positioned in the spaces between the fingers depicted in FIGS. 2 and 3. Alternating ones of the fingers on each side of the waveguiding path may be connected to one terminal of the source 32 and the other fingers to the other terminal of the source. In that case the period of the resulting grating structure is approximately the same as that of the gratings shown in FIGS. 2 and 3, but the degree of mode conversion for a given value of applied voltage is approximately doubled.

In a further modification, the particular finger spacing shown in FIGS. 2 and 3 is maintained but adjacent ones of the fingers on each side of the waveguiding path are connected to respectively different terminals of the source 32 while opposite fingers are connected to the same terminal. In that way, the grating period is doubled relative to that exhibited by the structures of FIGS. 2 and 3, and a component of electric field in the z direction is obtained.

What is claimed is:

1. In combination in an integrated optical device, electro-optic thin-film means defining a longitudinally extending optical waveguiding path whose lateral extent is defined approximately by first and second longitudinal reference lines, and electrode means for establishing along a portion of said longitudinally extending waveguiding path a spatially periodic refractive index variation, said electrode means comprising plural longitudinally spaced-apart pairs of facing electrode fingers, the fingers of each such facing pair being spaced apart laterally the distance between said first and second longitudinal reference lines to encompass therebetween a portion of said waveguiding path, and further including a substrate, wherein said thin-film means comprises a thin-film longitudinal ridge of an electro-optic material on said substrate, and wherein said electrode fingers are disposed on said substrate such that the facing ends of said fingers respectively abut the sides of said ridge.

2. A combination as in claim 1 further including means for applying a voltage to said electrode fingers.

* * * * *

UNITED STATES PATENT AND TRADEMARK OFFICE
CERTIFICATE OF CORRECTION

PATENT NO. : 3,877,782
DATED : April 15, 1975
INVENTOR(S) : Ivan P. Kaminow

It is certified that error appears in the above-identified patent and that said Letters Patent are hereby corrected as shown below:

Column 3, line 48, the equation should be $$-- P = \frac{\lambda}{N_{TM_0} - N_{TM_1}} --.$$

Signed and Sealed this twenty-sixth Day of August 1975

[SEAL]

Attest:

RUTH C. MASON
*Attesting Officer*

C. MARSHALL DANN
*Commissioner of Patents and Trademarks*